US011830203B2

(12) United States Patent
Yu et al.

(10) Patent No.: US 11,830,203 B2
(45) Date of Patent: *Nov. 28, 2023

(54) GEO-MOTION AND APPEARANCE AWARE DATA ASSOCIATION

(71) Applicant: Waymo LLC, Mountain View, CA (US)

(72) Inventors: Ruichi Yu, Mountain View, CA (US); Sachithra Madhawa Hemachandra, Campbell, CA (US); Ian James Mahon, Berkeley, CA (US); Congcong Li, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,682

(22) Filed: Apr. 25, 2022

(65) Prior Publication Data
US 2022/0245835 A1    Aug. 4, 2022

Related U.S. Application Data

(63) Continuation of application No. 16/726,053, filed on Dec. 23, 2019, now Pat. No. 11,315,260.

(51) Int. Cl.
*G06T 7/246* (2017.01)
*G06N 3/084* (2023.01)
(Continued)

(52) U.S. Cl.
CPC ............ *G06T 7/248* (2017.01); *G06N 3/045* (2023.01); *G06N 3/084* (2013.01); *G05D 1/0088* (2013.01);
(Continued)

(58) Field of Classification Search
CPC ...... G05D 1/0088; G06N 3/045; G06N 3/084; G06T 2207/10024; G06T 2207/10028;
(Continued)

(56) References Cited

U.S. PATENT DOCUMENTS

| 2014/0347475 | A1* | 11/2014 | Divakaran | ............ G06V 20/52 348/135 |
| 2016/0334797 | A1* | 11/2016 | Ross | ..................... H05K 999/99 |
| 2017/0094227 | A1* | 3/2017 | Williams | ............. H04N 13/271 |
| 2019/0191106 | A1* | 6/2019 | Dabral | .................. H04N 23/60 |

(Continued)

OTHER PUBLICATIONS

Stefan Hoermann ,"Object Detection on Dynamic Occupancy Grid Maps Using Deep Learning and Automatic Label Generation"—2018 IEEE Intelligent Vehicles Symposium (IV) Changshu, Suzhou, China, Jun. 26-30, 2018.*

(Continued)

*Primary Examiner* — Omar S Ismail
(74) *Attorney, Agent, or Firm* — Fish & Richardson P.C.

(57) ABSTRACT

Methods, systems, and apparatus, including computer programs encoded on computer storage media, for associating a new measurement of an object surrounding a vehicle with a maintained track. One of the methods includes receiving an object track for a particular object, receiving a new measurement characterizing a new object at a new time step, and determining whether the new object is the same as the particular object, comprising: generating a representation of the new object at the new and preceding time steps; generating a representation of the particular object at the new and preceding time steps; processing a first network input comprising the representations using a first neural network to generate an embedding of the first network input; and processing the embedding of the first network input using a second neural network to generate a predicted likelihood that the new object and the particular object are the same.

20 Claims, 4 Drawing Sheets

(51) Int. Cl.
  *G06N 3/045* (2023.01)
  *G05D 1/00* (2006.01)
(52) U.S. Cl.
  CPC .............. *G06T 2207/20084* (2013.01); *G06T 2207/30252* (2013.01)
(58) Field of Classification Search
  CPC ........... G06T 2207/20084; G06T 2207/30252; G06T 7/246; G06T 7/248
  See application file for complete search history.

(56) References Cited

U.S. PATENT DOCUMENTS

| | | | | |
|---|---|---|---|---|
| 2020/0019161 | A1* | 1/2020 | Stenneth | B60W 50/14 |
| 2020/0065665 | A1* | 2/2020 | Nageshrao | G06N 3/08 |
| 2020/0174490 | A1* | 6/2020 | Ogale | G06N 3/084 |
| 2020/0236296 | A1* | 7/2020 | Holzer | H04N 13/25 |
| 2020/0410352 | A1* | 12/2020 | Buckler | G06F 18/2163 |

OTHER PUBLICATIONS

Martin Dimitrievski, "Behavioral Pedestrian Tracking Using a Camera and LiDAR Sensors on a Moving Vehicle," Jan. 18, 2019, Sensors 2019, 19, 391;www.mdpi.com/journal/sensors, pp. 7,9,17-20, 30-31.*

Ting Yuan,"Extended Object Tracking using IMM Approach for a Real-World Vehicle Sensor Fusion System," Nov. 16-18, 2017,2017 IEEE International Conference on Multisensor Fusion and Integration for Intelligent Systems (MFI 2017),Daegu, Korea, pp. 638-642.*

Julie Dequaire, "Deep tracking in the wild: End-to-end tracking using recurrent neural networks",Jun. 22, 2017,The International Journal of Robotics Research 2018, vol. 37(4-5), pp. 492-507.*

Cho et al., "A Multi-Sensor Fusion System for Moving Object Detection and Tracking in Urban Driving Environments," 2014 IEEE International Conference on Robotics and Automation (ICRA), May 2014, 1836-1843.

Dinnitrievski, "Behavioral Pedestrian Tracking Using a Camera and LiDAR Sensors on a Moving Vehicle," Jan. 18, 2019, Sensors 2019, 19(391):7,9, 17-20, 30-31.

Hoernnann,"Object Detection on Dynamic Occupancy Grid Maps Using Deep Learning and Automatic Label Generation," 2018 IEEE Intelligent Vehicles Symposium (IV), Jun. 26-30, 2018, 8 pages.

Ting, "Extended Object Tracking using IMM Approach fora Real-World Vehicle Sensor Fusion Systenn," 2017 IEEE International Conference on Multisensor Fusion and Integration for Intelligent Systems (MFI 2017), Nov. 16-18, 2017, pp. 638-642.

* cited by examiner

GEO-MOTION AND APPEARANCE AWARE DATA ASSOCIATION

CROSS-REFERENCE TO RELATED APPLICATION

This is a continuation of U.S. application Ser. No. 16/726,053, filed on Dec. 23, 2019, the disclosure of which is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a system onboard a vehicle, e.g., an autonomous or semi-autonomous vehicle, can track objects surrounding the vehicle. In particular, the system can associate a new measurement of a new object surrounding the vehicle with a maintained track of a particular tracked object. That is, the system can determine that the new object characterized by the new measurement is the same object as the particular tracked object that is characterized by the maintained track.

The system can make this determination using geometry and motion information about the new object and the particular tracked object. The system can generate a prediction of whether the new object and the particular tracked object are the same object by processing a geo-motion embedding of the objects using an association distance neural network. The geo-motion embedding is an embedding of the relative location, shape, and size of the objects (i.e., the geometry of the objects) and the velocity and heading of the objects (i.e., the motion of the objects). In this specification, an embedding is an ordered collection of numeric values, e.g., a vector or matrix of floating point or other numeric values, that represents an input.

The geo-motion embedding can be generated by a geo-motion embedding neural network. In some implementations, the input to the geo-motion embedding neural network is a set of top-down rendered images of the respective objects at two time steps: a new time step, which is the time step at which the new measurement of the new object was captured; and a preceding time step, which is a time step at which the particular tracked object was measured, e.g., the most recent time step that the particular tracked object was measured. In some other implementations, the input to the geo-motion embedding can be a vector of measured values of the geometry and motion of the two objects, e.g., a vector that includes values characterizing the position, width, height, velocity, and/or heading of the objects.

In some implementations, the system can also use appearance information about the new object and the particular tracked object to determine whether the new object is the same as the particular object. That is, the system can generate an appearance embedding using an appearance embedding neural network. In some implementations, the input to the appearance embedding neural network includes images of the new object at the new time step and images of the particular tracked object at the preceding time step. The association distance neural network can then process both the geo-motion embedding and the appearance embedding to generate the prediction of whether the new object and the particular tracked object are the same object.

In this specification, a "track" is a collection of data characterizing a particular object at each of one or more time steps. For example, the track can include the top-down rendered images of the particular object and/or the vector of measured values of the geometry and motion of the particular object at each of the time steps at which the particular object was measured. In some implementations, the system maintains multiple tracks that each characterizes a different object that surrounds the vehicle. Then, the system can generate a predicted likelihood that each given tracked object is the same as the new object, and determine that one of the tracked objects is the same as the new object according to the predicted likelihoods. For example, the system can determine that a particular tracked object with the highest predicted likelihood is the same as the new object, and then add the new measurement of the new object to the maintained track of the particular tracked object. In some cases, the system can determine that none of the existing tracks characterize the same object as the new object, and generate a new track for the new object.

Once the track association neural network and the geo-motion embedding neural network have been trained, the neural networks can be deployed on a vehicle and can be used by the vehicle to make autonomous or semi-autonomous driving decisions.

Particular embodiments of the subject matter described in this specification can be implemented so as to realize one or more of the following advantages.

Some existing techniques use probabilistic data association to associate a new object with an existing track; e.g., some existing techniques use a Kalman Filter to calculate an association likelihood between a given new measurement and each existing track. Such existing techniques rely heavily on priors for the distributions of the existing tracks; if these priors are incorrect, then the predictions are unreliable and unstable. For example, a technique that relies on a Kalman Filter assumes that the states of the tracked objects and the new measurements follow a Gaussian distribution. In the real world, this assumption may not always be correct, especially for input signals such as the appearance of objects and other contextual information; in these cases, these techniques can produce unreliable results. Some implementations of track association systems described in this specification do not rely on such priors, and therefore are more robust.

Some other existing techniques rely solely on an appearance model of the surrounding objects; e.g., some existing techniques only process perspective images of the new object and tracked objects to determine which tracked object is the same as the new object. These techniques ignore geometry and motion information, which can be important for data association. Some implementations of track association systems described in this specification combine geo-motion embeddings and appearance embeddings to generate predictions; in this way, they are able to leverage both information about the geometry and motion of the surrounding objects and information about the appearance of the surrounding objects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system onboard a vehicle, e.g., an autonomous or semi-autonomous vehicle, can track objects surrounding the vehicle. In particular, the system can associate a new measurement of a new object surrounding the vehicle with a maintained track of another particular object. The system can generate a geo-motion embedding of the new object and the particular object using a geo-motion embedding neural network, and can process the geo-motion embedding using an association distance neural network to generate a predicted likelihood that the new object and the particular object are the same object. This specification also describes how training examples generated by vehicles can be used to effectively train the geo-motion embedding neural network and the association distance neural network to accurately and reliably make predictions.

Figure 1:
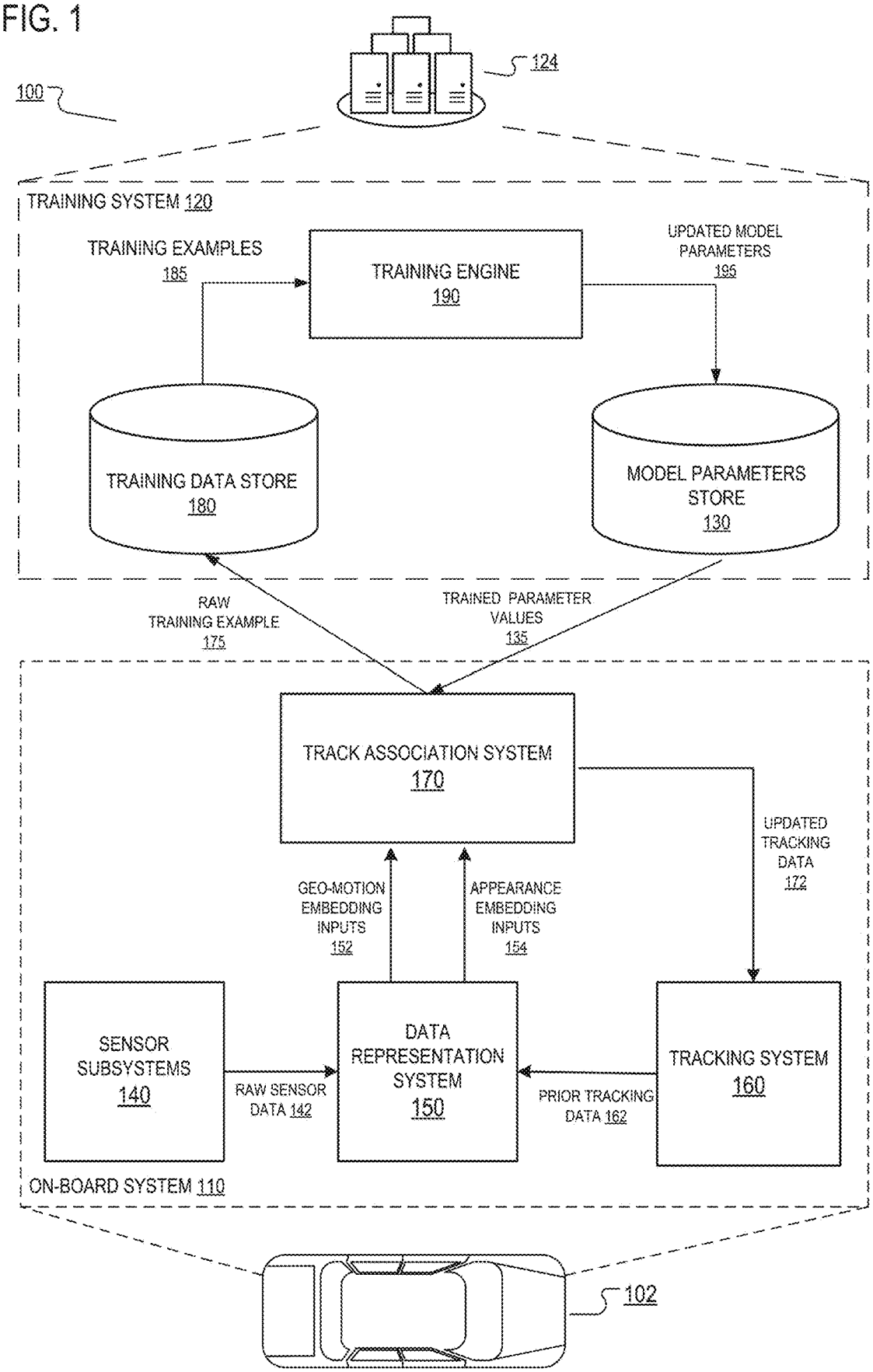
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 140. The sensor subsystems 140 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 140 or other components of the vehicle 102 can also classify groups of one or more raw sensor measurements from one or more sensors as being measures of another object. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify a group of raw sensor measurements as being measures of an object surrounding the vehicle 102, the sensor subsystems 140 can compile the raw sensor measurements into a set of raw sensor data 142, and send the raw sensor data 142 to a data representation system 150. That is, the raw sensor data 142 characterizes a new object surrounding the vehicle at a new time step.

The on-board system 110 also includes a tracking system 160 that maintains one or more tracks of objects surrounding the vehicle 102. A track of an object is a set of data that is generated from one or more measurements captured by the sensor subsystems 140 at respective time steps that have been determined to characterize the same object. A track of a particular object can characterize the position, velocity, and heading of the particular object over time. The tracking system 160 provides prior tracking data 162 to the data representation system 150. The prior tracking data can include one or more tracks of objects that surround the vehicle 102.

The data representation system 150, also on-board the vehicle 102, receives the raw sensor data 142 from the sensor subsystems 140 and the prior tracking data 162 from the tracking system 160. The data representation system 150 processes the received inputs and generates geo-motion embedding inputs 152 and appearance embedding inputs 154. The data representation system 150 can generate one geo-motion embedding input and one appearance embedding input per track in the prior tracking data 162.

Each appearance embedding input characterizes the appearance, from the perspective of the vehicle 102, of a particular tracked object at one or more preceding time steps and of the new object at the new time step. The appearance embedding input corresponding to a particular tracked object can be used by the track associated system 170 to determine whether the new object and the particular tracked object are the same object. For example, each appearance embedding input can include images of the object corresponding to a particular track captured by one or more cameras in the sensor system 140 at one or more preceding time steps, as well as images of the new object captured by the one or more cameras at the new time step. Instead or in addition, each appearance embedding input can include LIDAR data corresponding to the particular track captured by the sensor system 140 at the one or more preceding time steps, as well as LIDAR data corresponding to the new object captured by the sensor system 140 at the new time step. In some implementations, the LIDAR data can be projected onto a two-dimensional image space; in some other implementations, the LIDAR data can be three-dimensional. These images can be RGB images from the perspective of the vehicle 102 captured by the sensor subsystems 140.

Each geo-motion embedding input characterizes the geography and motion of a particular tracked object at one or more preceding time steps and of the new object at the new time step. An example geo-motion embedding input is discussed in more detail below in reference to FIG. 2.

The data representation system 150 provides the geo-motion embedding inputs 152 and the appearance embedding inputs 154 to the track association system 170, which uses these inputs either i) to associate the new object at the new time step with one of the existing tracks, or ii) to determine that the new object is not being tracked, and generate a new track for the new object.

In particular, for each particular track, the track association system 170 can provide the geo-motion embedding input corresponding to the particular track to a geo-motion embedding neural network to generate a geo-motion embedding. The geo-motion embedding encodes information about the geometry and the motion of the particular object at one or more preceding time steps and the new object at the new time step.

The track association system 170 can also provide the appearance embedding input corresponding to the particular track to an appearance embedding neural network to generate an appearance embedding. The appearance embedding encodes information about the appearance of the particular object at one or more preceding time steps and the new object at the new time step.

The track association system 170 can then process the geo-motion embedding and the appearance embedding for each track to select a track that the new object at the new time step should be associated with. That is, the track association system 170 can use the embeddings to select the track that characterizes an object at preceding time steps that is the same object as the new object at the new time step. For example, the track association system 170 can process the embeddings with an association distance neural network. This process discussed in more detail below in reference to FIG. 3 and FIG. 4.

The track association system 170 can generate updated tracking data 172 and provide the updated tracking data 172 to the tracking system 160. The updated tracking data 172 includes data characterizing the new object at the new time step associated with the selected existing track.

In some cases, the track association system 170 can determine that the new object is not the same as any object corresponding to an existing track. In these cases, the track association system 170 can make a new track for the new object. Here, the updated tracking data 172 includes data characterizing the new object at the new time step associated with the new track.

In some implementations, each maintained track of a particular object includes geo-motion embedding inputs and appearance embedding inputs characterizing the particular object at respective preceding time steps. That is, the updated tracking data 172 can include i) data characterizing the geometry and motion of the new object at the new time step from the geo-motion embedding inputs 152, and ii) data characterizing the appearance of the new object at the new time step from the appearance embedding inputs 154.

The object tracks maintained in the tracking system 160 can be used by one or more systems of the vehicle 102 during the operation of the vehicle 102. As a particular example, the object tracks can be used by a path prediction system to generate a predicted path for each of the tracked objects. The predicted path of a tracked object can be generated using information about the location and motion of the tracked object across multiple preceding time steps. The predicted paths can then be used by a path planning system of the vehicle 102 to generate a planned path for the vehicle 102 that avoids collisions with each of the tracked objects.

To associate the new object at the new time step with an existing track, the track association system 170 can use trained parameter values 135 that it obtains from a model parameters store 130 in the training system 120. For example, the trained parameter values 135 can include parameter values for the geo-motion embedding neural network, the appearance embedding neural network, and the association distance neural network.

The training system 120 is typically hosted within a data center 124, which can be a distributed computing system having hundreds or thousands of computers in one or more locations.

The training system 120 includes a training data store 180 that stores all the training data used to train the parameter values of the track association system 170. The training data store 180 receives raw training examples from vehicles operating in the real world. For example the training data store 180 can receive a raw training example 175 from the vehicle 102 and one or more other agents that are in communication with the training system 120. The raw training example 175 can be processed by the training system 120 to generate a new training example. The raw training example 175 includes the geo-motion embedding inputs 152 and the appearance embedding inputs 154 that together can be used as the input for the new training example. The raw training example 175 also includes a ground-truth output for the new training example, i.e., an identification of the existing track to which the new object at the new time step should be associated. In some implementations, the ground-truth output is generated using human labeling; that is, a user can inspect the measurements of the new object and each of the tracked objects, and determine either that the new object is the same as one of the tracked objects, or that the new object is not yet being tracked.

The training data store 180 provides training examples 185 to a training engine 190, also housed in the training system 120. The training engine uses the training examples 185 to update model parameters that will be used by the track association system 170, and provides the updated model parameters 195 to the model parameters store 130.

In some implementations, the training system 120 trains all of the neural networks in the track association system 170 at the same time, i.e., the parameters for each neural network are updated in the same backwards pass of backpropagation. In some other implementations, the training system 120 trains one neural network in the track association system 170 at a time. For example, the parameters of the association distance neural network and the appearance embedding neural network can be frozen while training the geo-motion embedding neural network, so that only the parameters of the geo-motion embedding neural network are updated in a given backwards pass of backpropagation. In some other implementations, the training system 120 can train any subset of the networks in the track association system 170 while freezing the parameters of the other networks in the track association system 170.

Once the parameter values of the track association system 170 have been fully trained, the training system 120 can send the trained parameter values 135 to the track association system 170, e.g., through a wired or wireless connection.

Figure 2:
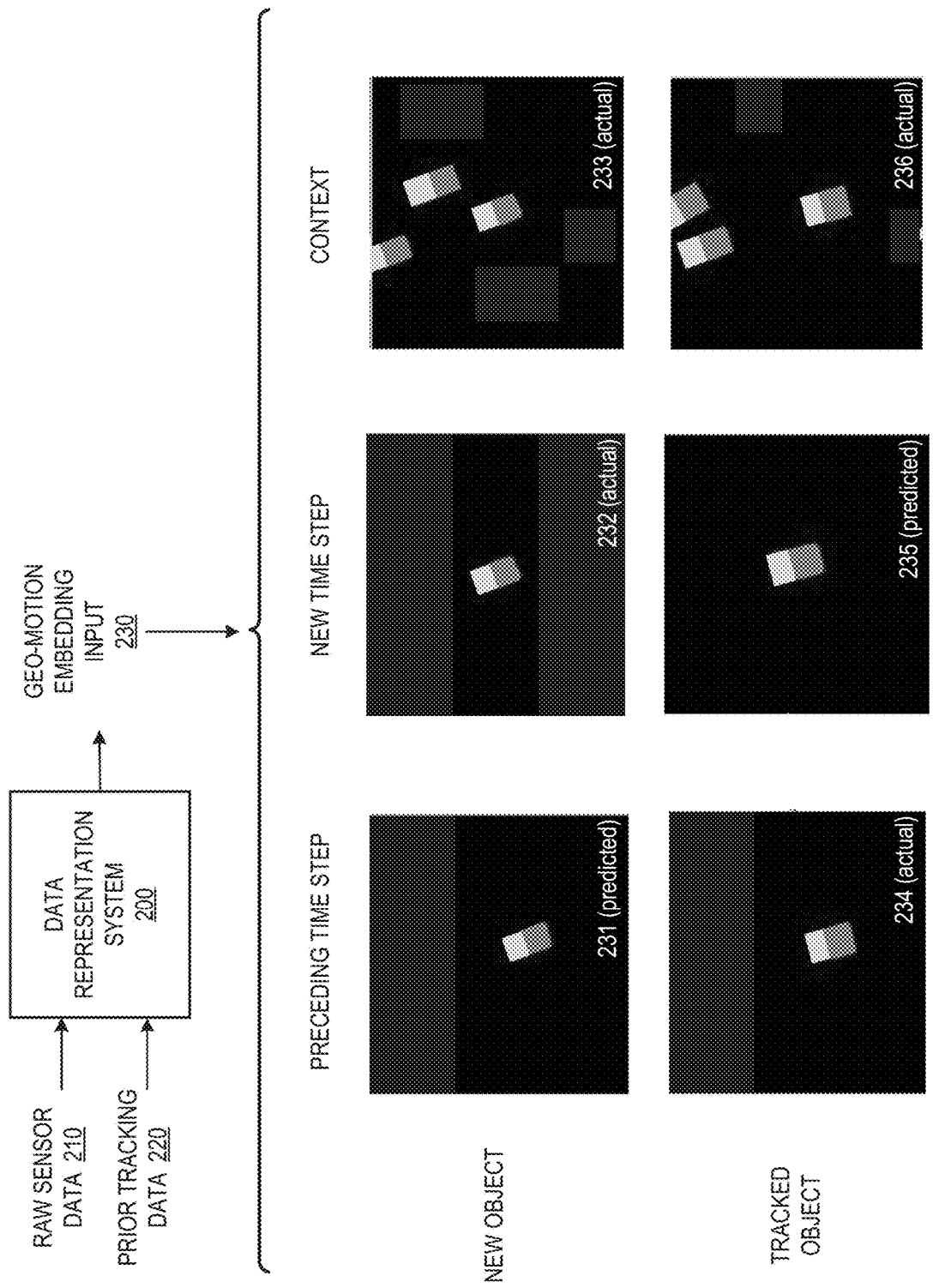
FIG. 2 is a diagram of an example data representation system for generating geo-motion embedding inputs.

FIG. 2 is a block diagram of an example data representation system 200 for generating a geo-motion embedding input 230. The data representation system 200 is an example of a system implemented as computer programs on one or more computers in one or more locations in which the systems, components, and techniques described below are implemented.

The data representation system 200 processes raw sensor data 210, which characterizes a new object at a new time step, and prior tracking data 220, which characterizes a tracked object at a preceding time step, to generate the geo-motion embedding input 230.

In some implementations, the geo-motion embedding input 230 is composed of six top-down rendered images 231-236, where each top-down rendered image includes a bounding box of a respective object at a respective time step.

Each bounding box includes two shades that characterize the direction of motion of the respective object. In particular, each bounding box has a light-gray portion and a dark-gray portion, indicating that the object characterized by the bounding box is moving in the direction of the light-gray portion away from the dark-gray portion. The motion characterized by the bounding boxes is absolute motion; that is, the motion characterized by the bounding boxes is not relative to the motion of the vehicle that captured the measurements.

In some implementations, the intensity of the pixel values in each bounding box can represent a magnitude of the velocity of the object characterized by the bounding box. For example, pixel values that have a higher intensity can indicate that the corresponding object has a larger velocity.

Each image of a respective object is centered around the position of the object at the new time step. That is, the center pixel of each image of an object is the location of the object at the new time step. If the image depicts the new object, then the location of the new object at the new time step is known; that is, it has been measured at the new time step. If the image depicts the tracked object, then the location of the tracked object at the new time step is predicted; that is, the tracked object has not been measured at the new time step, so the data representation system predicts the location of the tracked object at the new time step, e.g., using the measured motion of the tracked object at the preceding time step.

A first image 231 characterizes the new object at the preceding time step. The data representation system 200 does not have access to data characterizing the new object at the preceding time step; the data representation 200 only has access to data characterizing the new object at the new time step. Therefore, the first image 231 is a prediction of the position and velocity of the new object at the preceding time step. The data representation system 200 can use the data characterizing the new object at the new time step to generate the predicted first image 231. For example, using the velocity of the new object at the new time step, the data representation system 200 can infer a predicted location of the new object at the preceding time step by assuming that the new object maintained a constant velocity between the preceding time step and the new time step.

In some implementations, the velocity of an object can be estimated using an iterative closest point (ICP) technique. The velocity estimate can be generated by the data representation system 200, or by an external system that provides the velocity estimate to the data representation system 200. Given two point clouds captured by LIDAR sensors at different time points characterizing a particular object, a system can use the ICP technique to compute a transformation between the two point clouds, e.g., a particular translation and/or rotation that transforms the first point cloud to the second point cloud. This transformation can be used to estimate the velocity of the object.

A second image 232 characterizes the new object at the new time step. The data representation system 200 has access to data characterizing the new object at the new time step, so the system 200 does not have to make any prediction, but rather just encode the actual data into the top-down image.

A third image 233 characterizes a context around the new object at the new time step. The first image 231 and the second image 232 only characterize the new object; the third image 233 includes the new object and other objects measured at the new time step. The data representation system 200 has access to the data characterizing the new object and all other surrounding objects at the new time step, so the system 200 does not have to make any prediction.

A fourth image 234 characterizes the tracked object at the preceding time step. The data representation system 200 has access to the data characterizing the tracked object at the preceding time step, so the system 200 does not have to make any prediction.

A fifth image 235 characterizes the tracked object at the new time step. The data representation system 200 does not have access to data characterizing the tracked object at the new time step; the data representation 200 only has access to data characterizing the tracked object at the preceding time step. Therefore, the fifth image 235 is a prediction of the position and velocity of the tracked object at the preceding time step. The data representation system 200 can use the data characterizing the tracked object at the preceding time step to generate the predicted fifth image 235.

A sixth image 236 characterizes a context around the tracked object at the preceding time step. As before, the fourth image 234 and the fifth image 235 only characterize the tracked object; the sixth image 236 includes the tracked object and other objects measured at the preceding time step. The data representation system 200 has access to the data characterizing the tracked object and all other surrounding objects at the preceding time step, so the system 200 does not have to make any prediction.

In general, if the new object and the tracked object are the same object, then i) the predicted first image 231 of the new object at the preceding time step and the actual fourth image 234 of the tracked object at the preceding time step should be similar, and ii) the actual second image 232 of the new object at the new time step and the predicted fifth image 235 of the tracked object at the new time step should be similar.

In some other implementations, the geo-motion embedding input 130 is a numerical feature representation of the geometry and motion of each object at each time step. Each numerical feature representation can include one or more values characterizing the location of the respective object at the respective time step and one or more values characterizing the motion of the respective object at the respective time step. As a particular example, the geo-motion embedding input 130 corresponding to a tracked object can be a vector of real values that includes, for both objects at both time steps, values characterizing: an (x,y) location of the center of a bounding box of the object at the time step in a coordinate space, a length and width of the bounding box of the object at the time step, an angle of the bounding box of the object at the time step, and a velocity of the object at the time step decomposed into an x-velocity and a y-velocity in the coordinate space.

The geo-motion embedding input 230 generated by the data representation system 200 will be provided as input to a geo-motion embedding neural network trained to generate an embedding of the input 230. The embedding of the input 230 will be used to determine whether the new object and the tracked object are the same object.

Figure 3:
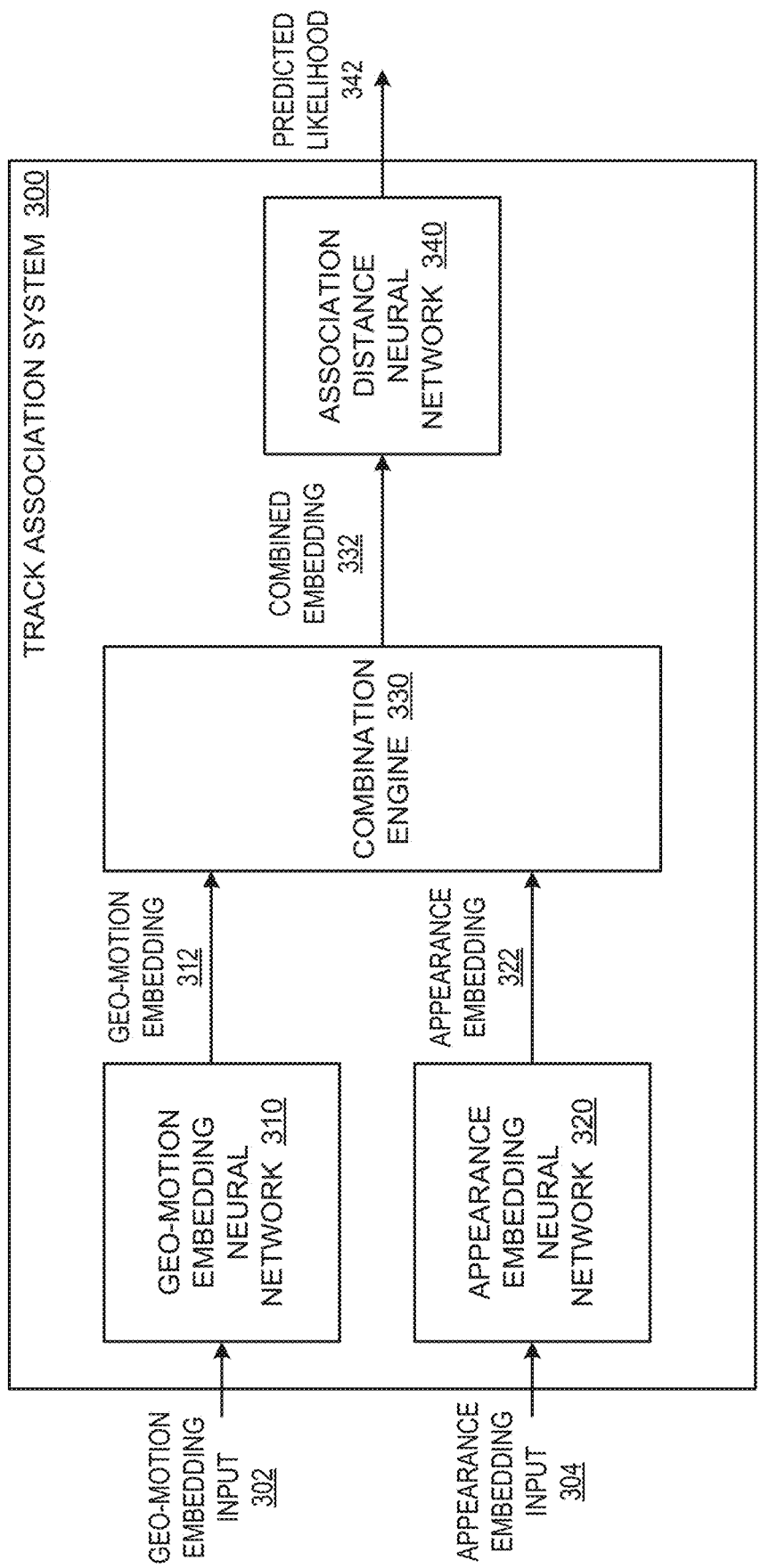
FIG. 3 is a block diagram of an example track association system.

FIG. 3 is a block diagram of an example track association system 300 of a vehicle. The track association system 300 is an example of a system implemented as computer programs on one or more computers in one or more locations in which the systems, components, and techniques described below are implemented. The track association system 300 includes a geo-motion embedding neural network 310, an appearance embedding neural network 320, a combination engine 330, and an association distance neural network 340.

The track association system 300 receives as input a geo-motion embedding input 302 and an appearance embedding input 304. The inputs characterize a new object at a new time step and a particular tracked object at a preceding time step that surround the vehicle.

The geo-motion embedding neural network 310 processes the geo-motion embedding input 302 to generate a geo-motion embedding 312, and provides the geo-motion embedding 312 to the combination engine 330. For example, the geo-motion embedding neural network 310 can be a convolutional neural network that processes top-down rendered images in the geo-motion embedding input 302. The geo-motion embedding 312 encodes information about the geometry and motion of the two objects.

The appearance embedding neural network 320 processes the appearance embedding input 304 to generate an appearance embedding 322, and provides the appearance embedding 322 to the combination engine 330. For example, the appearance embedding neural network 320 can be a convolutional neural network that processes images of the two objects in the appearance embedding input 304. The appearance embedding 322 encodes information about the appearance of the two objects. In some implementations, the appearance embedding neural network 320 processes images of the new object at the new time step to generate a first appearance embedding, and then processes images of the particular tracked object at the preceding time step to generate a second appearance embedding, and provides both the first appearance embedding and the second appearance embedding to the combination engine 330.

The combination engine 330 combines the geo-motion embedding 312 and the appearance embedding 322 to generate a combined embedding 332. In some implementations, the combination engine 330 concatenates the geo-motion embedding 312 and the appearance embedding 322, and the concatenated vector is the combined embedding 332. In some other implementations, the combination engine 330 processes the geo-motion embedding 312 and the appearance embedding 322 with one or more neural network layers to generate the combined embedding 332.

The association distance neural network 340 processes the combined embedding 332 to generate a predicted likelihood 342 that the new object measured at the new time step is the same object as the particular tracked object measured at the preceding time step. In some implementations, the association distance neural network 340 is a multilayer perceptron network.

Figure 4:
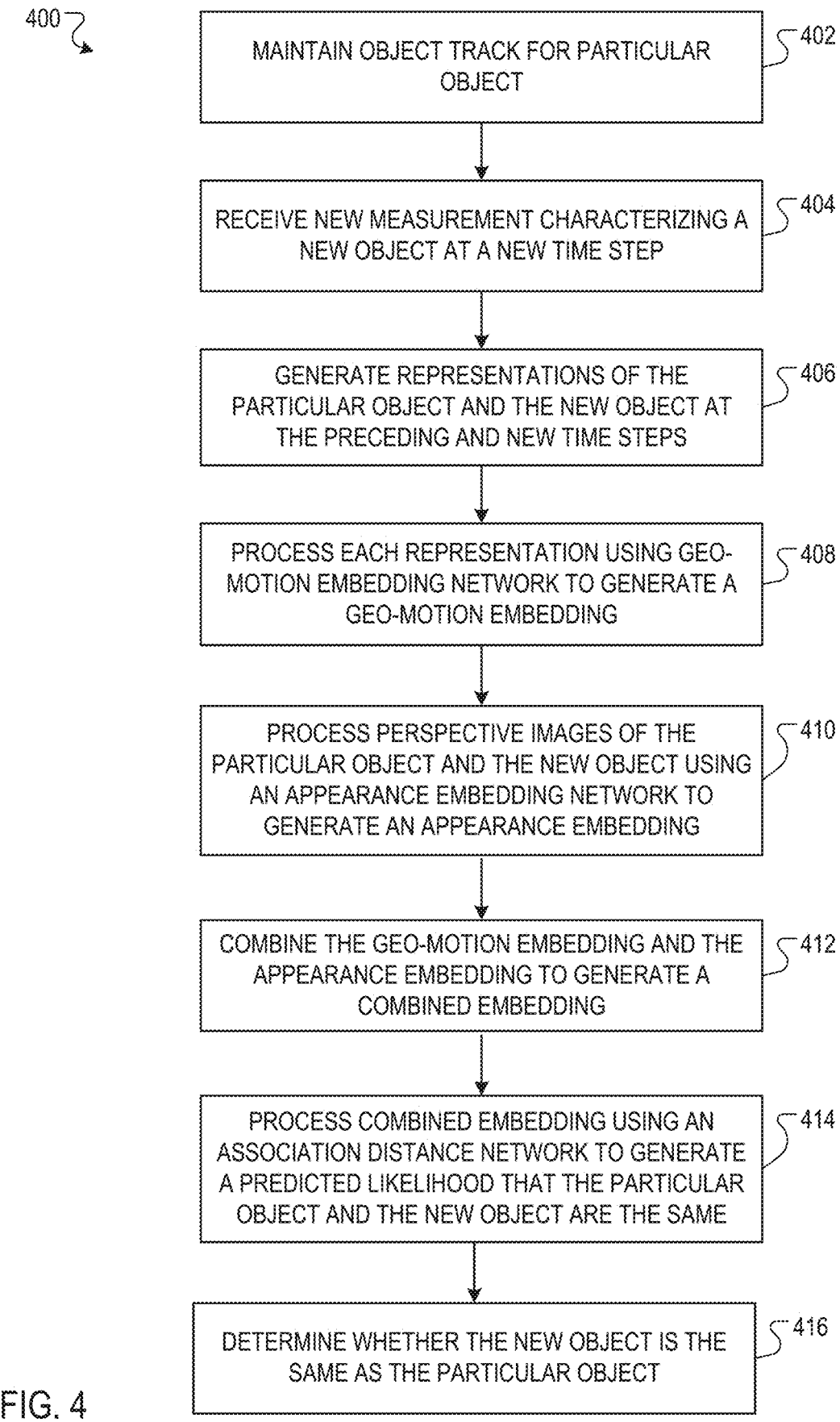
FIG. 4 is a flow diagram of an example process for associating a new measurement with a maintained track.

FIG. 4 is a flow diagram of an example process 400 for associating a new measurement of a new object surrounding a vehicle with a maintained track. For convenience, the process 400 will be described as being performed by a system of one or more computers located in one or more locations. For example, a track association system, e.g., the track association system 170 depicted in FIG. 1, appropriately programmed in accordance with this specification, can perform the process 400.

The system maintains an object track for a particular tracked object surrounding the vehicle (step 402). The maintained object track is generated from one or more measurements at preceding time steps that have been determined to characterize the particular tracked object. Each measurement is determined from sensor data captured by one or more sensors of the vehicle at the corresponding time step. For example, the maintained track can include geo-motion embedding inputs and appearance embedding inputs generated at respective preceding time steps.

The system receives the new measurement characterizing the new object at a new time step (step 404). The new measurement is determined from sensor data captured by the one or more sensors of the vehicle at the new time step.

The system generates representations of the particular tracked object and the new object at the preceding and new time steps (step 406). For example, the system can generate a top-down rendered image of each object at each time step. As another example, the system can generate a numerical feature representation of each object at each time step.

In some implementations, the system can also generate representations of an environment surrounding the new object at the new time step and the particular tracked object at the preceding time step. For example, the new measurement can include a measurement of the environment surrounding the new object at the new time step, and the maintained object track can include a measurement of the environment surrounding the particular tracked object at the preceding time step. The system can use the measurements of the environment to generate representations of the environment at respective time steps; e.g., the system can generate top-down rendered images 233 and 236 depicted in FIG. 2.

The system processes each representation using a geo-motion embedding neural network to generate a geo-motion embedding (step 408).

The system processes perspective images of the particular tracked object at the preceding time step and the new object at the new time step using an appearance embedding neural network to generate an appearance embedding (step 410). The perspective images can be captured by one or more cameras on-board the vehicle.

The system combines the geo-motion embedding and the appearance embedding to generate a combined embedding (step 412). In some implementations, the system combines the two embeddings by concatenating them.

The system processes the combined embedding using an association distance neural network to generate a predicted likelihood that the particular tracked object and the new object are the same object (step 414).

The system determines whether the new object is the same as the particular tracked object (step 416).

In some implementations, the system can repeat steps 402-414 using each of multiple other tracked objects to generate a respective predicted likelihood for each other tracked object. Then, the system can determine whether the new object is the same as the particular tracked object by determining whether the particular tracked object has a higher predicted likelihood than all of the other tracked objects. That is, the system can select the tracked object that has the highest predicted likelihood and determined that the selected tracked object is the same as the new object. In some cases, the system might determine from the predicted likelihoods that none of the tracked objects are the same as the new object. For example, there can be a threshold, e.g., 0.5 or 0.9, that the predicted likelihood of a tracked object must surpass for the system to determine that the tracked object is the same as the new object. If none of the predicted likelihoods surpass the threshold, then the system can determine the new object is not yet being tracked, and generate a track for the new object.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving an object track for a particular object;
receiving a new measurement characterizing a new object at a new time step, wherein the new measurement is determined from sensor data captured by one or more sensors of a vehicle at the new time step; and
determining whether the new object is the same as the particular object, comprising:
generating, from the new measurement, a representation of the new object at the new time step;
generating, from the object track, a predicted representation of the particular object at the new time step;
generating, from the new measurement, a predicted representation of the new object at a preceding time step;
generating, from the object track, a representation of the particular object at the preceding time step;
processing a first network input comprising i) the representation of the new object at the new time step, ii) the predicted representation of the particular object at the new time step, iii) the predicted representation of the new object at the preceding time step, and iv) the representation of the particular object at the preceding time step using a first neural network to generate an embedding of the first network input; and
processing a second network input comprising the embedding of the first network input using a second neural network to generate a predicted likelihood that the new object and the particular object are the same.

Embodiment 2 is the method of embodiment 1, wherein each representation of a respective object at a respective time step is a top-down rendered image.

Embodiment 3 is the method of embodiment 2, wherein:
each top-down rendered image comprises a plurality of pixels depicting a bounding box of the respective object at the respective time step, and
a plurality of pixel values of the pixels depicting the bounding box characterize a direction of motion of the respective object.

Embodiment 4 is the method of embodiments 3, wherein a plurality of pixel values of the pixels depicting the bounding box further characterize a magnitude of a velocity of the respective object.

Embodiment 5 is the method of any one of embodiments 2-4, wherein a center position of each top-down rendered image characterizes a location of the new object at the new time step.

Embodiment 6 is the method of any one of embodiments 1-5, wherein:
each representation of a respective object at a respective time step is a numerical feature representation of the respective object at the respective time step, and
each numerical feature representation comprises one or more location values and one or more motion values of the respective object at the respective time step.

Embodiment 7 is the method of any one of embodiments 1-6, wherein:
the new measurement further comprises a first environment measurement of an environment surrounding the new object at the new time step;
object track further comprises a second environment measurement of an environment surrounding the particular object at the preceding time step;
the determining further comprises:
generating, from the new measurement, a representation of the environment at the new time step; and
generating, from the object track, a representation of the environment at the preceding time step; and
the first network input further comprises i) the representation of the environment at the new time step and ii) the representation of the environment at the preceding time step.

Embodiment 5 is the method of any one of embodiments 1-7, wherein:
the new measurement comprises a first perspective image characterizing the new object at the new time step;

the object track comprises a second perspective image characterizing the particular object at the preceding time step;

the method further comprises generating a second embedding of the first perspective image and the second perspective image by processing a third network input comprising the first perspective image and the second perspective image using a third neural network; and the second network input further comprises the second embedding of the first perspective image and the second perspective image.

Embodiment 9 is the method of embodiment 8, wherein the second network input comprises a combined embedding, wherein the combined embedding is generated by concatenating i) the embedding of the first network input and ii) the second embedding of the first perspective image and the second perspective image.

Embodiment 10 is the method of any one of embodiments 1-9, further comprising:

receiving one or more other object tracks for other objects;

for each other object, generating a respective predicted likelihood that the new object and the other object are the same; and determining, using the predicted likelihoods, whether the particular object and the new object are the same.

Embodiment 11 is the method of embodiment 10, wherein determining whether the particular object and the new object are the same comprises determining whether the particular object has a higher predicted likelihood than all of the other objects.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

receiving an object track for a particular object that identifies a location in an environment of the particular object at a preceding time step;

receiving a new measurement characterizing a location in the environment of a new object at a new time step; and determining whether the new object is the same as the particular object, comprising:

generating, from the new measurement, a first representation that identifies a predicted location in the environment of the new object at the preceding time step, wherein the generating is based on the location of the new object at the new time step;

generating, from the object track, a second representation that identifies the location of the particular object at the preceding time step; and processing a network input generated from at least the first representation and the second representation using a neural network to generate a predicted likelihood that the new object and the particular object are the same.

2. The method of claim 1, wherein the network input has further been generated from one or more of:

a third representation generated from the new measurement that identifies the location of the new object at the new time step; or a fourth representation generated from the object track that identifies a predicted location in the environment of the particular object at the new time step.

3. The method of claim 1, wherein one or more of the first representation or second representation comprises a top-down rendered image.

4. The method of claim 3, wherein the top-down rendered image for at least one of the representations comprises a plurality of pixels depicting a bounding box of the respective object at the respective time step.

5. The method of claim 4, wherein a plurality of pixel values of the respective pixels depicting the bounding box characterize one or more of (i) a direction of motion of the respective object at the respective time step, or (ii) a magnitude of a velocity of the respective object at the respective time step.

6. The method of claim 3, wherein a center position of the top-down rendered image for at least one of the representations characterizes the location of the new object at the new time step.

7. The method of claim 1, wherein:

one or more of the first representation or second representation comprises a numerical feature representation of the respective object at the respective time step, the numerical feature representation comprising one or more location values and one or more motion values of the respective object at the respective time step.

8. The method of claim 1, wherein:
the method further comprises identifying one or more of:
a first environment measurement of the environment at the new time step or a second environment measurement of the environment at the preceding time step; and
the network input has further been generated from one or more of:
a fifth representation generated from the new measurement that represents the environment at the new time step; and
a sixth representation generated from the object track that represents the environment at the preceding time step.

9. The method of claim 1, wherein:
the method further comprises identifying one or more of:
a first perspective image characterizing the new object at the new time step, or a second perspective image characterizing the particular object at the preceding time step; and
the network input has further been generated from one or more of the first perspective image or the second perspective image.

10. The method of claim 1, wherein determining whether the new object is the same as the particular object further comprises:
receiving one or more other object tracks for respective other objects;
for each other object, generating a respective predicted likelihood that the new object and the other object are the same; and
determining, using the predicted likelihoods, whether the particular object and the new object are the same.

11. A system comprising one or more computers and one or more storage devices storing instructions that are operable, when executed by the one or more computers, to cause the one or more computers to perform operations comprising:
receiving an object track for a particular object that identifies a location in an environment of the particular object at a preceding time step;
receiving a new measurement characterizing a location in the environment of a new object at a new time step; and
determining whether the new object is the same as the particular object, comprising:
generating, from the new measurement, a first representation that identifies a predicted location in the environment of the new object at the preceding time step, wherein the generating is based on the location of the new object at the new time step;
generating, from the object track, a second representation that identifies the location of the particular object at the preceding time step; and
processing a network input generated from at least the first representation and the second representation using a neural network to generate a predicted likelihood that the new object and the particular object are the same.

12. The system of claim 11, wherein the network input has further been generated from one or more of:
a third representation generated from the new measurement that identifies the location of the new object at the new time step; or
a fourth representation generated from the object track that identifies a predicted location in the environment of the particular object at the new time step.

13. The system of claim 11, wherein one or more of the first representation or second representation comprises a top-down rendered image.

14. The system of claim 11, wherein:
one or more of the first representation or second representation comprises a numerical feature representation of the respective object at the respective time step, the numerical feature representation comprising one or more location values and one or more motion values of the respective object at the respective time step.

15. The system of claim 11, wherein determining whether the new object is the same as the particular object further comprises:
receiving one or more other object tracks for respective other objects;
for each other object, generating a respective predicted likelihood that the new object and the other object are the same; and
determining, using the predicted likelihoods, whether the particular object and the new object are the same.

16. One or more non-transitory computer storage media encoded with computer program instructions that when executed by a plurality of computers cause the plurality of computers to perform operations comprising:
receiving an object track for a particular object that identifies a location in an environment of the particular object at a preceding time step;
receiving a new measurement characterizing a location in the environment of a new object at a new time step; and
determining whether the new object is the same as the particular object, comprising:
generating, from the new measurement, a first representation that identifies a predicted location in the environment of the new object at the preceding time step, wherein the generating is based on the location of the new object at the new time step;
generating, from the object track, a second representation that identifies the location of the particular object at the preceding time step; and
processing a network input generated from at least the first representation and the second representation using a neural network to generate a predicted likelihood that the new object and the particular object are the same.

17. The non-transitory computer storage media of claim 16, wherein the network input has further been generated from one or more of:
a third representation generated from the new measurement that identifies the location of the new object at the new time step; or
a fourth representation generated from the object track that identifies a predicted location in the environment of the particular object at the new time step.

18. The non-transitory computer storage media of claim 16, wherein one or more of the first representation or second representation comprises a top-down rendered image.

19. The non-transitory computer storage media of claim 16, wherein:
one or more of the first representation or second representation comprises a numerical feature representation of the respective object at the respective time step, the numerical feature representation comprising one or more location values and one or more motion values of the respective object at the respective time step.

20. The non-transitory computer storage media of claim 16, wherein determining whether the new object is the same as the particular object further comprises:

receiving one or more other object tracks for respective other objects;

for each other object, generating a respective predicted likelihood that the new object and the other object are the same; and determining, using the predicted likelihoods, whether the particular object and the new object are the same.

* * * * *